(12) United States Patent
Coulthard et al.

(10) Patent No.: US 6,305,231 B1
(45) Date of Patent: *Oct. 23, 2001

(54) FLOW METERING

(75) Inventors: John Coulthard, Heighington; Rui Xue Cheng, Middlesborough, both of (GB)

(73) Assignee: ABB Kent-Taylor Limited, Glouchestershire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/761,163

(22) Filed: Dec. 6, 1996

(30) Foreign Application Priority Data

Dec. 7, 1995 (GB) .................................. 9525067

(51) Int. Cl.[7] ........................................ G01F 1/86
(52) U.S. Cl. ........................................... 73/861.01
(58) Field of Search ........................ 73/866.04, 861.06, 73/861.08; 324/660

(56) References Cited

U.S. PATENT DOCUMENTS

| 4,266,188 | * | 5/1981 | Thompson | 324/65 R |
| 4,509,366 | * | 4/1985 | Matsushita et al. | 73/861.02 |
| 4,751,842 | * | 6/1988 | Ekrann et al. | 73/861.04 |

* cited by examiner

Primary Examiner—Benjamin R. Fuller
Assistant Examiner—Jewel V. Thompson
(74) Attorney, Agent, or Firm—Hodgson Russ LLP

(57) ABSTRACT

A method of measuring a characteristic of a flowing fluid comprising measuring said characteristic by means of two or more sensors which have differing responses to a variable affecting said measurement, and combining the outputs (as herein defined) of the sensors, so that the differences in the responses thereof cancel each other and the combined output is substantially independent of said variable.

12 Claims, 5 Drawing Sheets

FLOW METERING

The invention relates to flow measurement, and especially to the "relative" measurement of mass flow rate of multiphase flows in particular to the flow of gas-solids mixtures. In some applications an absolute measurement of mass flow rate is not required. For example, in fossil burning electrical power generation, coal is heated, pulverised and then injected into a furnace through a number of pipes, each fed from a manifold or "flow splitter" which in turn is fed from a larger diameter pipe. Accurate control of the "split" of the fuel is important in helping to increase the combustion efficiency. It is therefore only necessary to measure the relative quantity of solids passing along each pipeline.

When solids are conveyed in a pneumatic transport system, electrical charging of the particles occurs due primarily to frictional contact between particles and between particles and the pipe wall. The total charge cannot be predicted since it depends upon the variable conditions of solids transportation such as the solids velocity, the type of material, the particle size and shape, moisture content, the material comprising the conveying pipe walls, the roughness of the inner surface of the conveying pipe, the diameter of the pipe and the distance travelled by the particle. The charge polarity is also dependent on those conditions.

The mass flow rate of the solids can be determined inferentially by separately measuring the solids velocity and the solids concentration. The mass flow rate is obtained from the product of the two parameters. The velocity of the particles can be readily measured by cross correlation of induced signals derived from annular electrostatic sensors fitted into the pipe wall. A signal related to the solids concentration is obtained from the root mean square value of the signals detected by annular electrodes.

If we have the same flow conditions in several pipes (same solids material, equal transport distances, equal velocity and pipe conditions), it is reasonable to assume the signal amplitude to be related to the quantity of solids transported through that pipe. It has been shown from earlier experimental tests that under "lean phase" flow conditions this assumption is valid. Therefore, a relative measurement of the solids loading can, in principle, be achieved.

In practice electrostatic sensors are used mounted flush with the pipe wall but the spatial sensitivity is determined by an inverse square law leading to erroneous results if a non-uniform solids distribution occurs, as is quite likely to happen in practice.

At least in its preferred embodiments, the present invention is directed to providing a solution to this problem.

In one aspect the invention provides a method of measuring a characteristic of a flowing fluid comprising measuring said characteristic by means of two or more sensors which have differing responses to a variable affecting said measurement, and combining the outputs (as herein defined) of the sensors, so that the differences in the responses thereof cancel each other and the combined output is substantially independent of said variable.

Included in the term "output" are signals derived from the output, for example an RMS value thereof.

The characteristic may be a concentration of charged particles in said flowing fluid.

The characteristic thus may be a concentration of solid particles in the flowing fluid. Alternatively, the characteristic may be another phase concentration, for example liquid droplets in a gas flow, or droplets of one liquid in another immiscible carrier liquid.

The variable may be a distance of the particle or droplet from the sensor when it is sensed thereby.

The method may also include scaling or otherwise modifying the output of at least one of the sensors before the sensor outputs are combined.

In another aspect the invention provides apparatus for measuring a characteristic of a flowing fluid comprising at least two sensors for measuring said characteristic, said sensors having differing responses to a variable affecting said measurement, and means for combining the outputs of the sensors so that the differences in the responses thereof cancel each other out and the combined output is substantially independent of said variable.

Thus when the characteristic is a concentration of charged particles the sensors may be electrostatic electrodes.

The electrodes may be of different widths, measured in the direction of flow.

The apparatus may have a flow passage for the flowing fluid, the electrodes being annular and spaced from each other in the flow direction.

The invention will now be described merely by way of example with reference to the accompanying drawings, wherein:

BRIEF DESCRIPTION OF DRAWINGS

Referring to FIG. 1, an electrostatic flowmeter consists of a grounded conductive flow duct or pipe 10 having an annular electrostatic sensor electrode 12 extending around its inner circumference and mounted in an insulating ring 14.

When a fluid containing charged particles passes through the duct signals are generated in the sensor electrode 12 by several mechanisms including charge transfer and induction.

Figure 2:
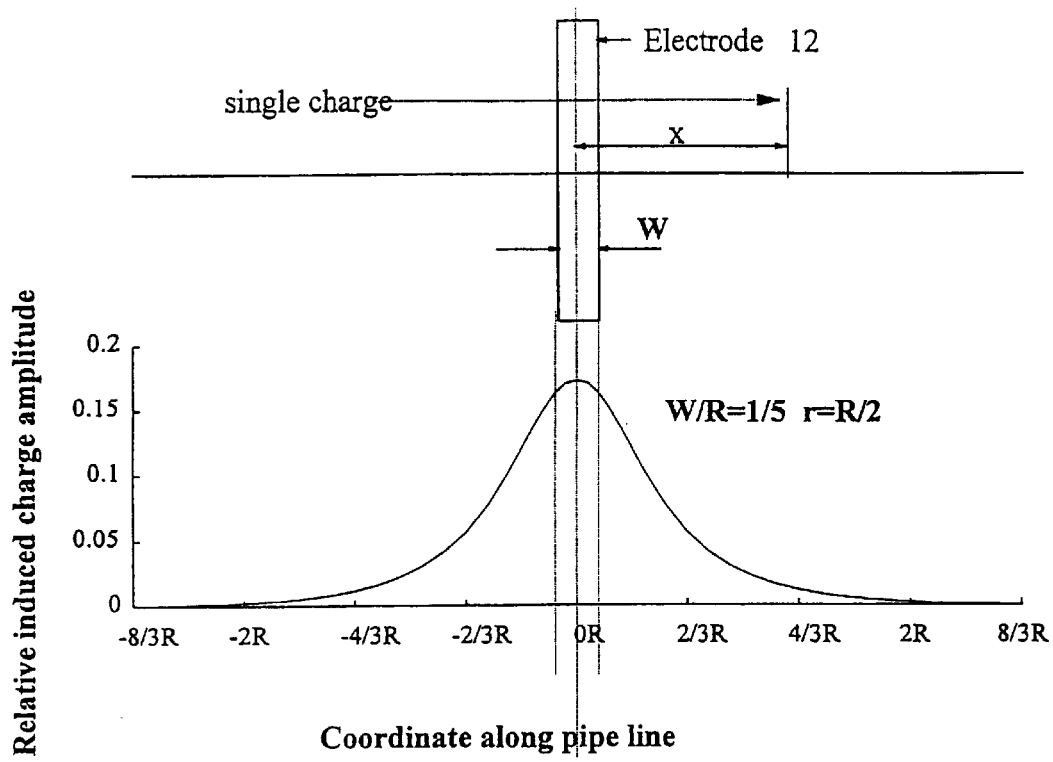
FIGS. 2 and 3 show the charge induced on and the signal produced by the electrode of the meter of FIG. 1.

For a "narrow" electrode, i.e. one whose axial length is muchless than the pipe diameter. FIG. 2 shows the variation of induced charge on the sensor due to the passage of a single charged particle through the sensing field. In this case, the electrode has a ratio of width W to pipe radius R of W/R=⅕, the charged particle passing through the sensor along an axial line at r=R/2.

Figure 4:
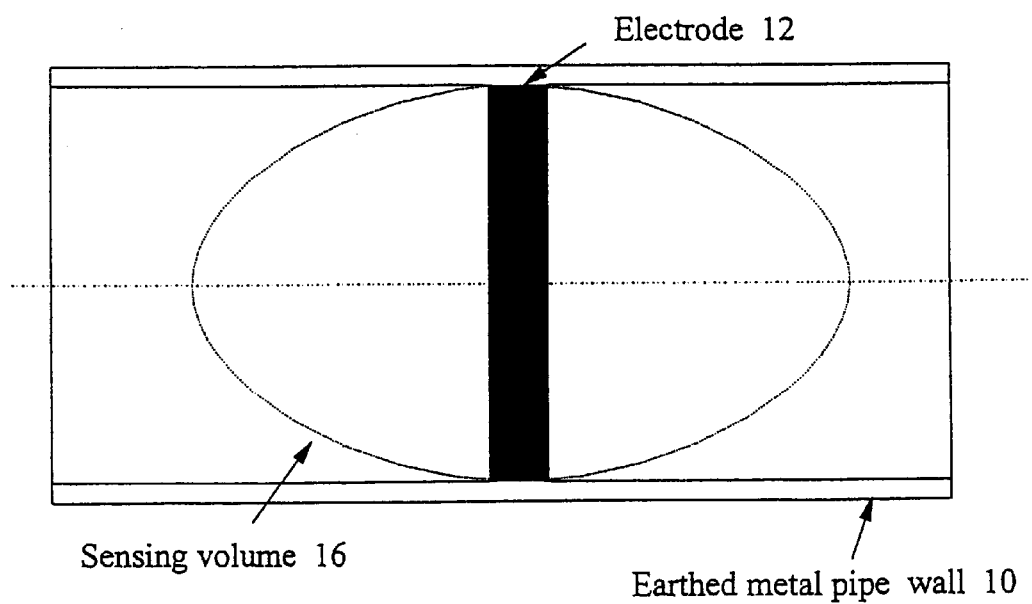
FIG. 4 shows the sensing volume of the electrode of FIG. 1.
Figure 3:
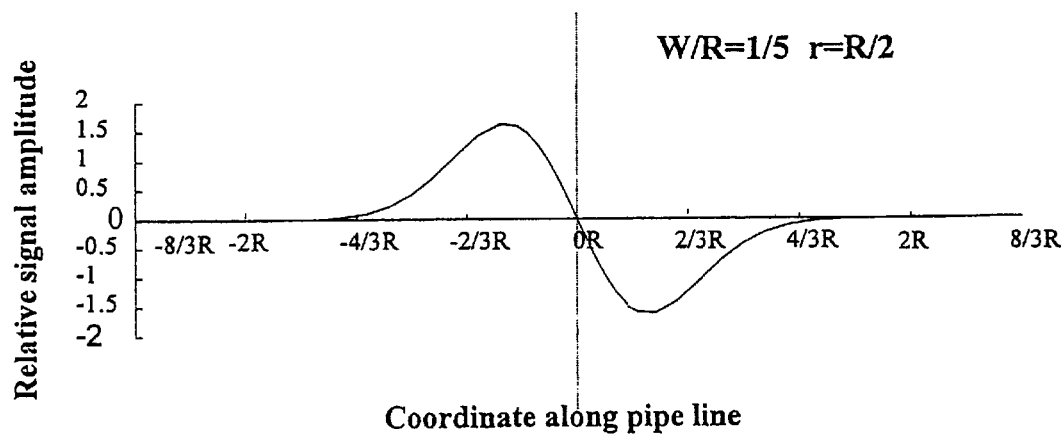

Effectively there is a region here referred to as the "sensing volume" shown at 16 in FIG. 4 within which a particle can be detected. FIG. 2 shows that the induced charge increases as the particle approaches the physical volume enclosed by the electrode reaching its highest level when it passes through the center line of the electrode and decreases as the particle moves away from the electrode. From FIG. 2, the spatial current $I=dQ/dx$ can be obtained and is plotted in FIG. 3. It can be seen that the current I is zero as the particle passes through the centre of the electrode.

The range of sensitivity varies depending the location of the stream line. The sensor detects streams of flowing particles at greater axial distances along an axial line closer to the pipe central axis than streams moving closer to the pipe wall. This compensates to some extent for the loss of sensitivity associated with the inverse square law characteristic. For a narrow electrode, the physical volume comprises only a small proportion of the sensing volume, most of which exists outside of the electrode 12.

Figure 5:
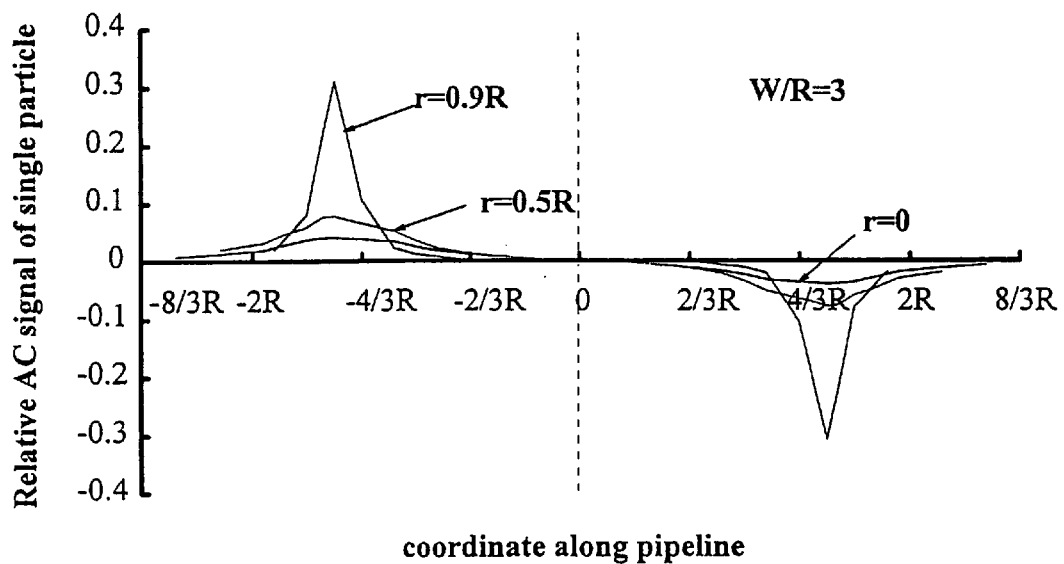
FIGS. 5 and 6 show the AC signal induced in and the sensing volume of a considerably wider electrode than that of FIG. 1.

The AC signals resulting from a single particle passage a wider electrode with a geometry of W/R=3 are plotted in FIG. 5. From this it can be observed that the sensitive region comprises two sensing zones or volumes 18,20 at each end of the electrode 12. Effectively as the electrode width increases, the two sensing zones are displaced towards the ends of the electrode. At the centre of the electrode the sensitivity is zero and this insensitive central section increases with electrode width.

From the above it is clear that the shape of the effective sensing volume for wider electrodes is significantly different to that for narrow electrodes.

Figure 7:
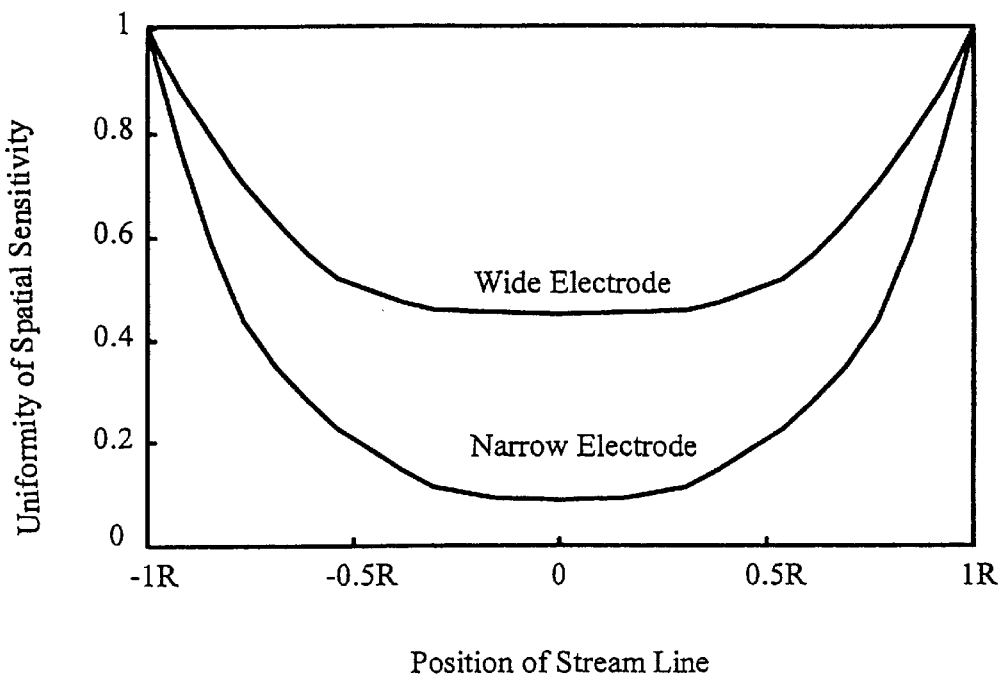
FIGS. 7 and 9 show the spatial sensitivity of the electrodes across the flow duct, determined theoretically and by experiment respectively.

To obtain a measure of solids concentration based on induced charge signals, it is required that, for a given velocity, the induced sensor signal remains the same whatever the particle exists within the pipe. Induced signals, which predominate, obey the inverse square law so that, the further away a moving charge is from an electrode, the lower is the detected signal. Particles moving at a fixed velocity along a pipe central axis induce a lower signal than that produced by the same quantity of particles moving closer to the pipe walls. The spatial sensitivity of two ring electrodes of substantially different widths is shown in FIG. 7. This characteristic is derived from mathematical modelling using finite element analysis. The boundary conditions of the electrostatic field related to the sensor and the pipe have been considered in constructing the model. Such spatial sensitivity characteristics have been verified in the laboratory which give a close agreement.

The characteristic clearly slows that an unequal weighting of the solids concentration signal is obtained depending upon where they are located within the sensing volume, thereby reducing the accuracy of the estimate solids concentration in a pipeline.

To increase the measurement accuracy of the solids concentration it is necessary to improve the uniformity of the spatial sensitivity of the electrode such that, ideally, a "flat" response is obtained.

Figure 10:
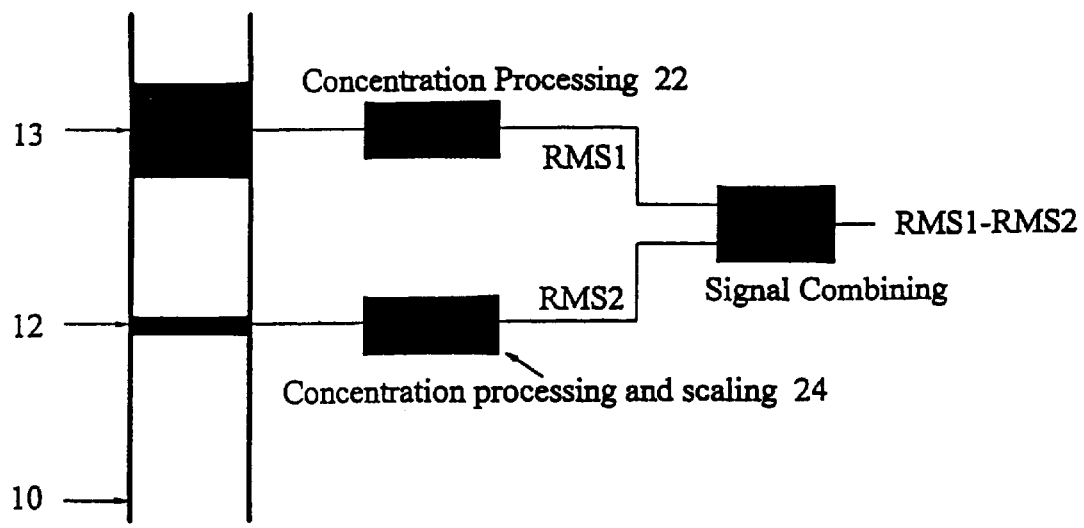
FIG. 10 shows one form of flowmeter according to the invention.

Based on the above spatial sensitivity characteristics a method for achieving a more uniform spatial characteristic is proposed shown schematically in FIG. 10. It is based on the following two properties of a single ring electrode.

1) The spatial sensitivity of a wider ring electrode is higher than that of a narrow electrode.
2) The spatial sensitivity of a narrow electrode is different mainly since the narrow electrode is relatively insensitive to solids flowing in the centre of the pipe.

By referring to FIG. 7 it is clear that, if the curves could be scaled and then subtracted, an improvement in overall spatial sensitivity will result. The effect of subtraction is to reduce the "near-wall" sensitivity whilst leaving the sensitivity to solids flowing along the centre of the pipe relatively unaffected.

Figure 8:
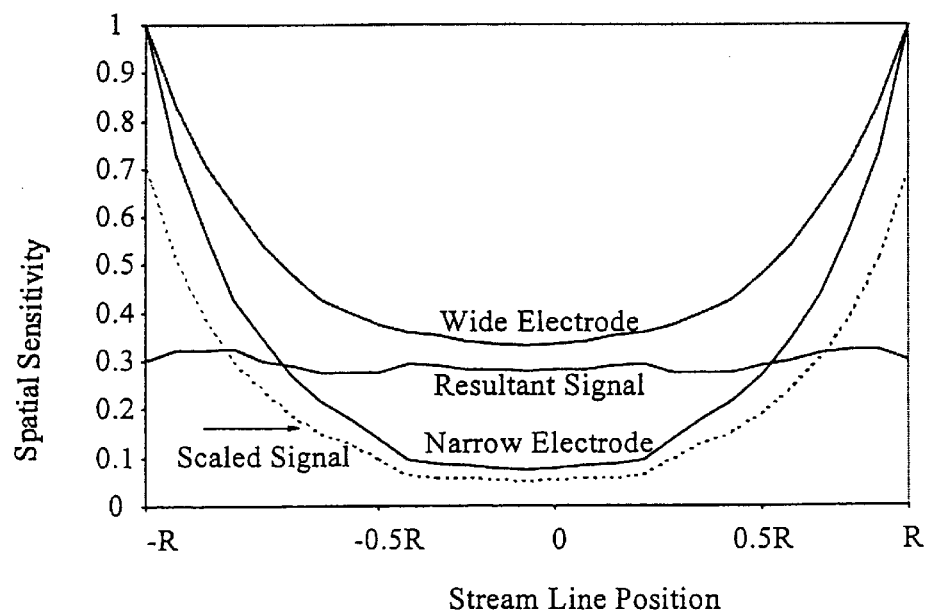
FIG. 8 illustrates the combination of output signals in accordance with the invention.

This can be explained using the theoretical results shown in FIG. 7. If we scale the gain of the amplifier for the narrow electrode the combined signal is as shown in FIG. 8. The combined spatial sensitivity depends upon the scaling. The value of the scaling parameter to achieve optimum uniformity of the combined spatial sensitivity depends on the width ratio of the two sensors. For example, for a pipe diameter of 333 mm with a large sensor of W=R and a narrow sensor of W=2 mm the value of 0.7.

Figure 9:
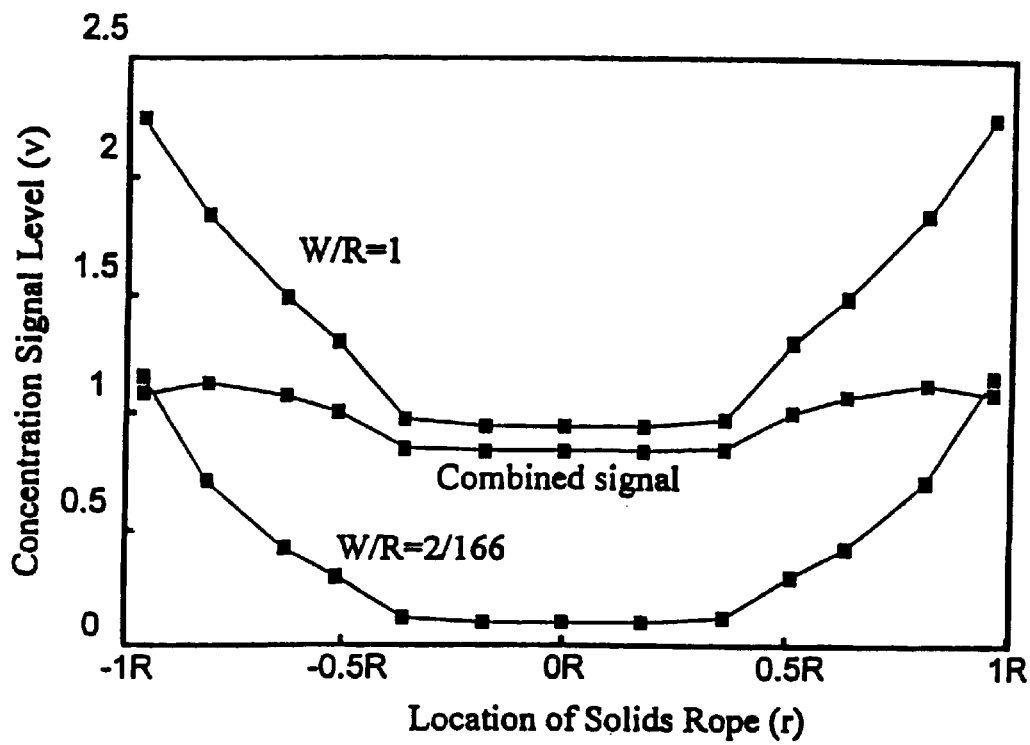

One example showing the effect obtained by experiment is displayed in FIG. 9 where the scaling factor was 0.67.

The subtraction can be carried out digitally by the host computer or electronically and is shown schematically in FIG. 9. Alternatively, by careful selection of the relative electrode widths an overall "flat" response is possible by merely combining the outputs with or without scaling of one of them.

Figure 1:
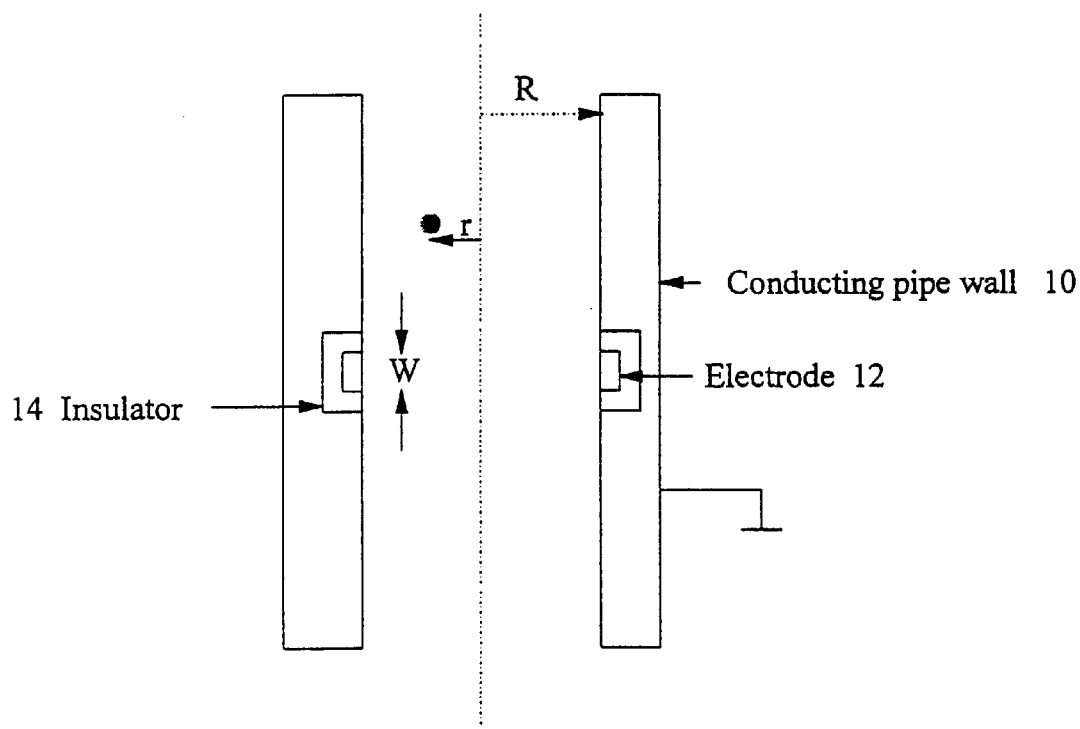
FIG. 1 illustrates a conventional electrostatic flowmeter.
Figure 6:
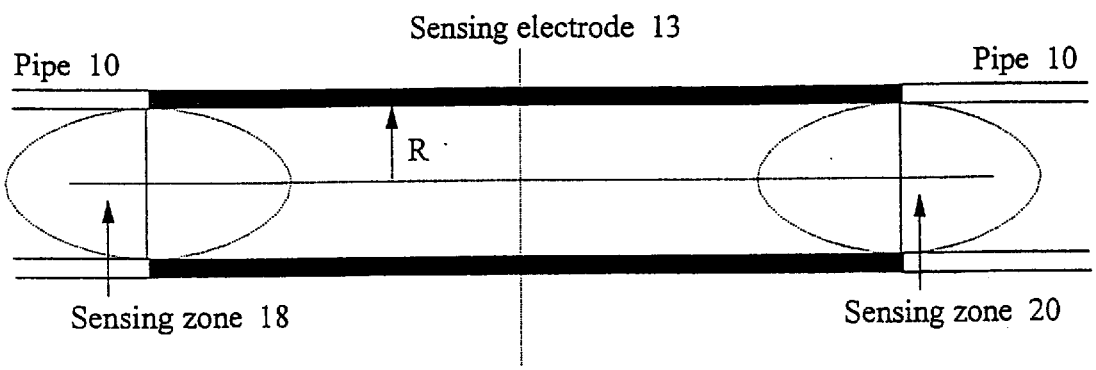

Referring to FIG. 10, a flowmeter embodying the invention consists of a grounded conductive pipe 10, having a narrow insulated electrode 12 as already described with reference to FIG. 1, and a further wide electrode 13 as described with reference to FIG. 6. The electrodes 12,13 are separated axially of the pipe so that their sensing volumes do not overlap, but of course close enough to measure the same flow regime.

The outputs of the electrodes are cleaned-up and concentrated by conventional signal processors 22,24, to produce RMS values, the RMS value of the narrow electrode signal also being scaled as already discussed. The output signals then are subtracted in a signal combiner 26, to produce an output signal which is substantially unaffected by the distribution in the fluid flow of solids particles across the diameter of the pipe 10.

Although the theoretical discussion of the invention has bene with reference to stream lines, the invention in practice is not limited to laminar flow regimes, and is effective when used for measuring turbulent flows.

Thus a preferred embodiment of the invention provides a method for measuring the solids concentration by combining signals from one or more electrodes of different widths so that the resultant signal from a moving charged particle or fluid droplet is the same wherever it exists in the pipe.

It contemplates the use of electrodes of varied widths such that by selective combination of their signals the contribution from flow properties at any radius can be enhanced whilst others are suppressed to give signals such that a measure of solids or phase velocity at different radii is obtained. The combination and scalling of signals from electrodes of different widths situated sufficiently close to each other to detect the same flow regime thus can give a combined uniform spatial sensitivity.

Although described in the context of ring electrodes around a pipe, the use of other sensor arrays is contemplated to determine the radial velocity profile and concentration profile by selective combinations of signals from several sensors to enhance the desired signals as required.

In addition to electrostatic sensors, capacitive, optical, radiological, microwave, ultrasonic and other sensors are alternatively contemplated.

Each feature disclosed in this specification (which term includes the claims) and/or shown in the drawings may be incorporated in the invention independently of other disclosed and/or illustrated features.

The text of the abstract filed herewith is hereby deemed to be repeated here in full as part of the specification.

What is claimed is:

1. A method of measuring a concentration characteristic of a flowing fluid comprising providing two or more sensors in a flow passage for the fluid and in sensing relation to the flowing fluid, said sensors having differing responses to a spatial variable affecting measurement of the characteristic, measuring the characteristic by means of the two sensors, and applying the outputs of the sensors to a signal combiner in which the outputs are subtracted, so that the differences in the responses thereof cancel each other and the combined output is substantially independent of said spatial variable affecting said measurement.

2. A method as claimed in claim 1, wherein the measuring step further comprises concentrating charged particles in said flowing fluid.

3. A method as claimed in claim 2, wherein the measuring step further comprises responding to a distance of the particle or droplet from the sensor when it is sensed thereby.

4. A method as claimed in claim 1, wherein the measuring step further comprises concentrating solid particles in the flowing fluid.

5. A method as claimed in claim 4, wherein the measuring step further comprises responding to a distance of the particle from the sensor when it is sensed thereby.

6. A method as claimed in claim 1, wherein the measuring step further comprises concentrating liquid droplets in the flow, whether by phase concentrating in two-phase flow or otherwise.

7. A method as claimed in claim 6, wherein the measuring step further comprises responding to a distance of the particle or droplet from the sensor when it is sensed thereby.

8. A method as claimed in claim 1, comprising scaling or otherwise modifying the output of at least one of the sensors before the sensor outputs are combined.

9. Apparatus for measuring a concentration characteristic of a flowing fluid comprising at least two sensors for measuring said characteristic, said sensors having differing responses to a spatial variable affecting said measurement, and a signal combiner operatively connected to the outputs of the sensors for combining the outputs of the sensors and for subtracting the outputs, so that the differences in the responses thereof cancel each other out and the combined output is substantially independent of said spatial variable affecting said measurement.

10. Apparatus as claimed in claim 9, wherein the characteristic is a concentration of charged particles in said flowing liquid, the sensors being electrostatic electrodes.

11. Apparatus as claimed in claim 10, wherein the electrodes are of different widths, measured in the direction of flow.

12. Apparatus as claimed in claim 10, wherein the apparatus has a flow passage for the flowing fluid, the electrodes being annular and spaced from each other in the flow direction.

* * * * *